Figure 1:
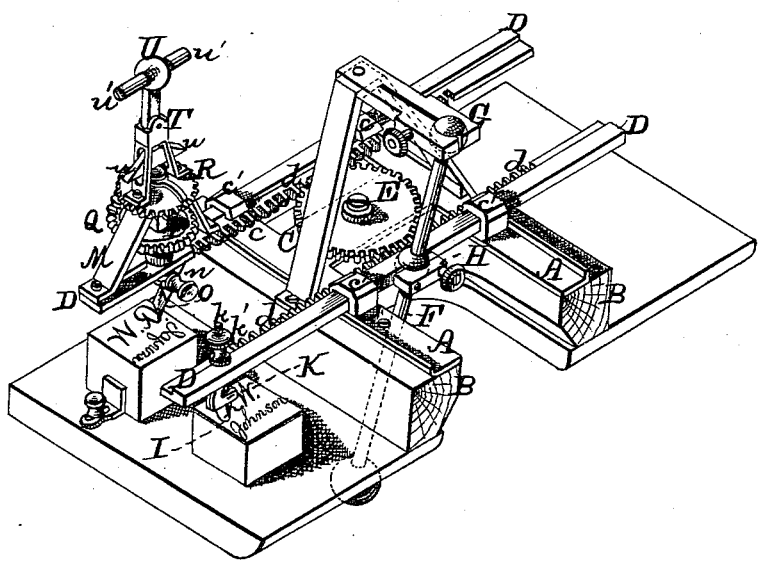

2 Sheets--Sheet 1.

R. W. JOHNSON.
Engraving-Machine.

No. 167,542.

Patented Sept. 7, 1875.

WITNESSES:
Jas. E. Hutchinson
John R. Young

INVENTOR:
R. W. Johnson, by
Prindle &co for his attys

R. W. JOHNSON.
Engraving-Machine.
No. 167,542.
2 Sheets--Sheet 2.
Patented Sept. 7, 1875.
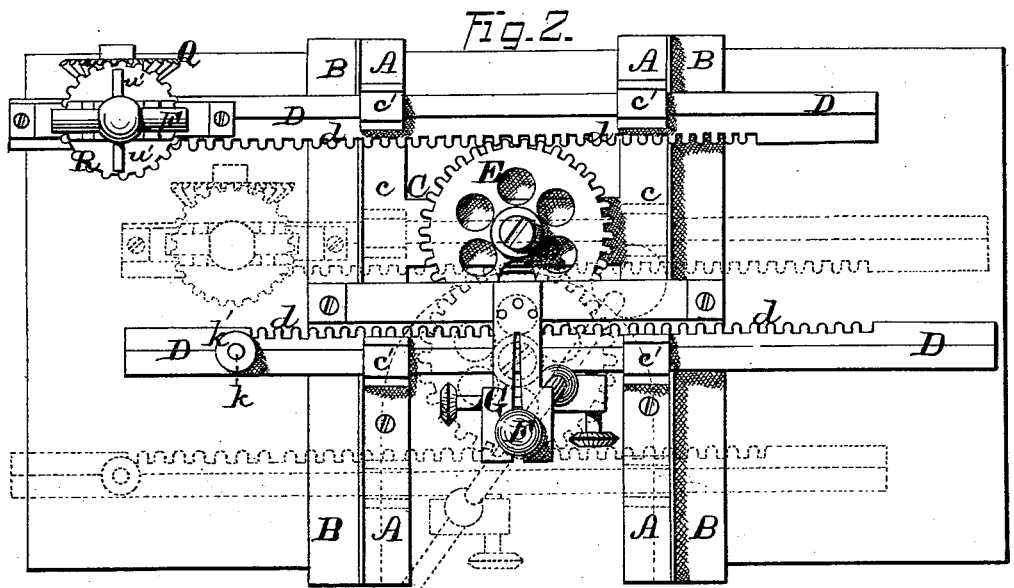
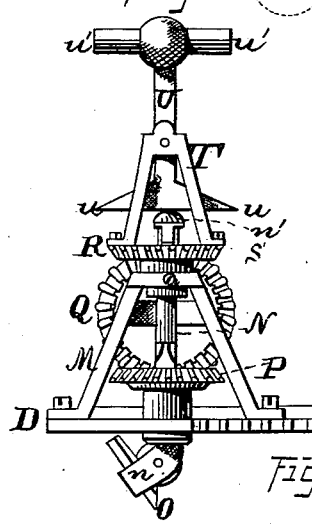
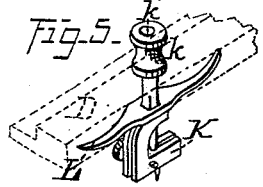
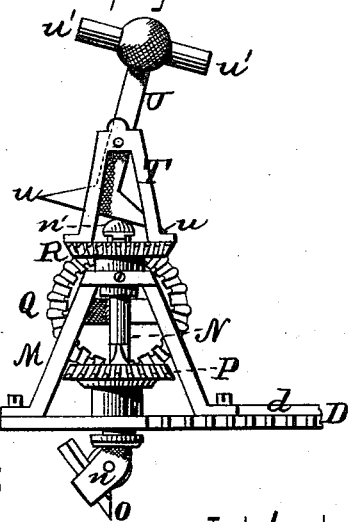
WITNESSES:
Jas. E. Hutchinson
John R. Young
INVENTOR.
R. W. Johnson, by
Prindle and Co., his Attys

UNITED STATES PATENT OFFICE.

ROICE W. JOHNSON, OF FORT DODGE, IOWA.

IMPROVEMENT IN ENGRAVING-MACHINES.

Specification forming part of Letters Patent No. 167,542, dated September 7, 1875; application filed June 11, 1875.

*To all whom it may concern:*

Be it known that I, R. W. JOHNSON, of Fort Dodge, in the county of Webster and in the State of Iowa, have invented certain new and useful Improvements in Engraving-Machines; and do hereby declare that the following is a full, clear, and exact description thereof, reference being had to the accompanying drawings making a part of this specification, in which—

Figure 1 is a perspective view of my machine as arranged for use. Fig. 2 is a plan view of the upper side of the same, the dotted lines showing a change in position of the operative parts. Fig. 3 is a side elevation of the mechanism employed for moving vertically, and for rotating the graver. Fig. 4 is a like view of the same, showing a change in the positions of the operative parts, and Fig. 5 is a perspective view of the clamp employed for securing in place and adjusting, vertically, the tracing-point.

Letters of like name and kind refer to like parts in each of the figures.

The object of my invention is to enable a design, written, traced, or otherwise prepared upon a suitable surface, to be transferred, by engraving, to a block of wood, to which end it consists, principally, in the means employed for giving to the graver a horizontal motion in any direction, substantially as and for the purpose hereinafter specified. It consists, further, in the means employed for moving the graver vertically, substantially as and for the purpose hereinafter shown. It consists, further, in the means employed for rotating the graver, substantially as and for the purpose hereinafter set forth. It consists, finally, in the means employed for securing the tracing-point in position, and for adjusting the same vertically, substantially as and for the purpose hereinafter shown and described.

In the annexed drawings, A and A represent two ways, which are secured in parallel lines to or upon suitable supporting-blocks B and B, and furnish a bearing for an H-shaped frame, C, which rests upon and slides longitudinally within said ways. Each end of the parallel bars $c$ and $c$ of the sliding frame C, is turned inward, so as to form a bearing, $c'$, for a bar, D, which is capable of free longitudinal motion therein, and is provided upon its inner edge with a toothed rack, $d$, that meshes with a gear-wheel, E, which is pivoted to or upon the central portion of said frame, and has such dimensions as to cause it to engage with each of said bars. As thus arranged, it will be seen that if motion is given to one of the bars D, such motion will be communicated, through the gear-wheel E, to the other bar D, and the latter caused to move to an equal distance, but in an opposite direction. Motion is imparted to the bars D and D and the frame C, by means of a lever, F, which, at its upper end, is swiveled within a suitable bearing, G, that is sustained in an elevated position above said parts, and from said bearing extends downward through a ball-and-socket bearing, H, which is attached to or upon the edge at the longitudinal center of one of said bars D, the arrangement being such as to give to the lower end of said lever, which is grasped by the hand of the operator, freedom of motion, horizontally, in any direction. One of the bars D carries a graver, and the other bar the tracing-point I, which latter is held vertically within a clamp, K, said clamp being attached to or within said bar D by means of a threaded bolt, $k$, which extends vertically upward from the upper end of the former, through a suitable opening in the latter, and is provided above said bar with a thumb-nut, $k'$. A spring, L, placed between the upper end of the clamp K and the lower side of the bar D, presses the former downward with sufficient force to cause it to maintain its position, while, by revolving the nut $k'$ upon the screw $k$, said clamp and the tracing-point may be raised or lowered, as desired. Secured to or upon the corresponding end of the opposite bar D from the tracing-point I, is an A-shaped standard, M, within which and within said bar is journaled a vertical shaft, N, that upon its lower end is provided with a clamp, $n$, for the reception of a graver, O, said clamp being extended laterally outward and downward at an angle of about forty-five degrees from a vertical line, so as to bring the point of said graver in a line with the axial center of said shaft. Immediately above its lower bearing the shaft N is squared, and upon such portion is loosely fitted a bevel-gear, P, which meshes with and receives motion from a second bevel-gear, Q, that is journaled in a vertical plane upon a stud, m, which projects horizontally outward from the standard M. A third bevel-gear wheel, R, is journaled upon the upper end of the shaft N, and meshes with the gear-wheel Q, so that, by the rotation of the former, the graver O, through the intervening mechanism, is caused to revolve in an opposite direction. In order that the graver O may be depressed as much as may be necessary, the shaft N is made somewhat longer than would otherwise be required, and between the upper side of the gear-wheel R and an enlarged head, n', that is provided upon the upper end of said shaft, is placed a spring, S, that operates to raise the latter to its limit of motion in such direction. Within an A-shaped standard, T, that is secured to and revolves with the gear-wheel R, is pivoted a lever, U, which, at its lower end, is provided with a cross-bar, u, that bears against the upper end of the shaft N, and, when said lever is turned upon its pivotal bearing in either direction, presses said shaft downward. A cross-bar, u', secured to the upper end of the lever U, enables the same and the graver to be rotated.

The machine is now complete, and is operated as follows: A diagram of the design to be engraved is secured in position beneath and within reach of the point of the tracer, and a block of wood, suitable for engraving, is in like manner fixed beneath the graver, after which the tracer is caused to follow the lines of the diagram, and the graver pressed downward until its point will cut the face of its block. As the course of the lines change, the graver is rotated so as to keep it in proper position for cutting, while the light and heavy lines are produced by a lesser or greater depression of said graver.

By means of this mechanism any design can be transferred to and engraved upon a block with ease and dispatch, and without the exercise of such skill as is required for ordinary engraving.

Having thus fully set forth the nature and merits of my invention, what I claim as new is—

1. The frame C c c', bars D d, gear-wheel E, and lever F, constructed and combined to operate in the manner and for the purpose specified.

2. The vertical shaft N, carrying the graver O, and capable of a rotary movement within suitable bearings, in combination with the lever U u and spring S, all of said parts being constructed and arranged to operate in the manner substantially as shown.

3. In combination with the shaft N that carries the graver O, the gear-wheels P, Q, and R, substantially as and for the purpose set forth.

4. In combination with the tracing-point I, the clamp K, provided with the bolt k and nut k', secured within the bar D, and having between its end and the lower side of said bar the spring L, substantially as and for the purpose shown and described.

In testimony that I claim the foregoing I have hereunto set my hand.

ROICE W. JOHNSON.

Witnesses:
I. GARMOE,
DANIEL M. CROSBY.